United States Patent [19]

Frerich

[11] Patent Number: 4,691,503
[45] Date of Patent: Sep. 8, 1987

[54] HOUSING FOR HOLDING A SUPPLY ROLL OF LARGE ROUND BALE WRAP MATERIAL

[75] Inventor: Josef Frerich, Dietrichingen, Fed. Rep. of Germany

[73] Assignee: Deere & Company, Moline, Ill.

[21] Appl. No.: 883,793

[22] Filed: Jul. 8, 1986

[51] Int. Cl.$^4$ .............................................. B65B 11/04
[52] U.S. Cl. ........................................ 53/587; 53/118; 53/389; 242/55.53
[58] Field of Search ..................... 53/118, 587, 389; 242/55.53; 56/391; 100/88, 5

[56] References Cited

U.S. PATENT DOCUMENTS

| 2,322,950 | 6/1943 | Madsen | 242/55.53 |
| 3,007,650 | 11/1961 | Burton | 242/55.53 |
| 4,406,421 | 9/1983 | Schultz | 242/55.53 |

FOREIGN PATENT DOCUMENTS

| 1440814 | 4/1966 | France | 242/55.53 |
| 2152872 | 8/1985 | United Kingdom | 56/341 |
| 2159762 | 12/1985 | United Kingdom | 100/5 |

Primary Examiner—John Sipos

[57] ABSTRACT

A mechanism for enveloping a large round bale with a wrap material such as plastic sheet or net includes a housing for holding a supply roll of such material. The mechanism is mounted to the rear of a bale discharge gate. The housing is substantially enclosed except for an open front which is closed by a panel carried by the gate. The housing is vertically pivotally mounted for swinging away from the gate to a lowered position disposing its open front so that it faces rearwardly for reception of a supply roll of wrap material. A spring-loaded U-shaped structure is provided on the housing for biasing the material toward a lower front corner defined at the juncture of a plane containing a bottom wall of the housing and the panel.

8 Claims, 2 Drawing Figures

HOUSING FOR HOLDING A SUPPLY ROLL OF LARGE ROUND BALE WRAP MATERIAL

RELATED APPLICATIONS

On a date even with the filing date of the instant application, the following commonly assigned applications were filed for covering inventions at least partly disclosed in this application:

1. Application Ser. No. 883,791 filed in the names of Verhulst et al and entitled SYSTEM FOR AUTOMATICALLY ENVELOPING A LARGE ROUND BALE WITH A WRAPPING.

2. Application Ser. No. 883,196 filed in the names of Frimml et al and entitled WRAP MATERIAL STRIPPER AND GUIDE ASSEMBLY.

3. Application Ser. No. 883,794 filed in the names of Anstey et al and entitled MECHANISM FOR FEEDING WRAP MATERIAL INTO A BALE-FORMING CHAMBER FOR ENVELOPING A LARGE ROUND BALE.

4. Application Ser. No. 883,239 filed in the names of Verhulst et al and entitled ASSEMBLY FOR GUIDING WRAP MATERIAL FROM THE REAR OF A BALER TO A BALE-FORMING CHAMBER INLET.

BACKGROUND OF THE INVENTION

The present invention relates to a mechanism for enveloping large round bales with a wrap material such as plastic sheet or net and more particularly relates to a housing for holding a supply roll of such wrap material.

Supply rolls of material for wrapping large round bales normally include a tubular support about which the wrap material is wound. Mechanisms for feeding this wrap material into the bale-forming chamber of baler normally include a structure for engaging the tubular support so as to permit it to rotate when wrap material is being fed into the chamber from the supply roll during bale wrapping operation. U.S. Pat. No. 4,366,665 granted to VanGinhoven on Jan. 4, 1983 discloses an example of such a supply roll support. As supply rolls are relatively heavy, it has been found that it is somewhat difficult for one man to load a supply roll onto a supply roll support of this type.

SUMMARY OF THE INVENTION

According to the present invention there is provided an improved support for holding a supply of wrap material for use in enveloping a large round bale.

A broad object of the invention is to provide wrap material supply roll support which lends to easy loading of a supply roll.

A more specific object of the invention is to provide a supply roll support which supports the roll at its periphery.

A further object of the invention is to provide a supply roll support in the form of a box or housing into which a roll is merely deposited during loading thereof.

Yet another object of the invention is to provide a supply roll support in the form of a box or housing which is mounted for being pivoted to a lowered loading position for receiving a supply roll.

Still another object of the invention is to provide a supply roll box or housing, as defined above, having a spring biased arm assembly pivotally mounted thereto for urging a supply roll located in the box toward a dispensing position located in a corner defined at the intersection of a plane containing a bottom wall of the box and a panel closing an open side of the box when the box is in closed dispensing position.

Another object of the invention is to provide a spring biased arm, as set forth in the previous object, which acts to apply a force to a supply roll of wrap material which changes throughout the diametral change the roll undergoes as wrap material is used such that the force required to pull the wrap material from the roll remains substantially constant.

These and other objects will become apparent from reading the ensuing description together with the appended drawings.

DESCRIPTION OF THE PREFERRED EMBODIMENT

Figure 1:
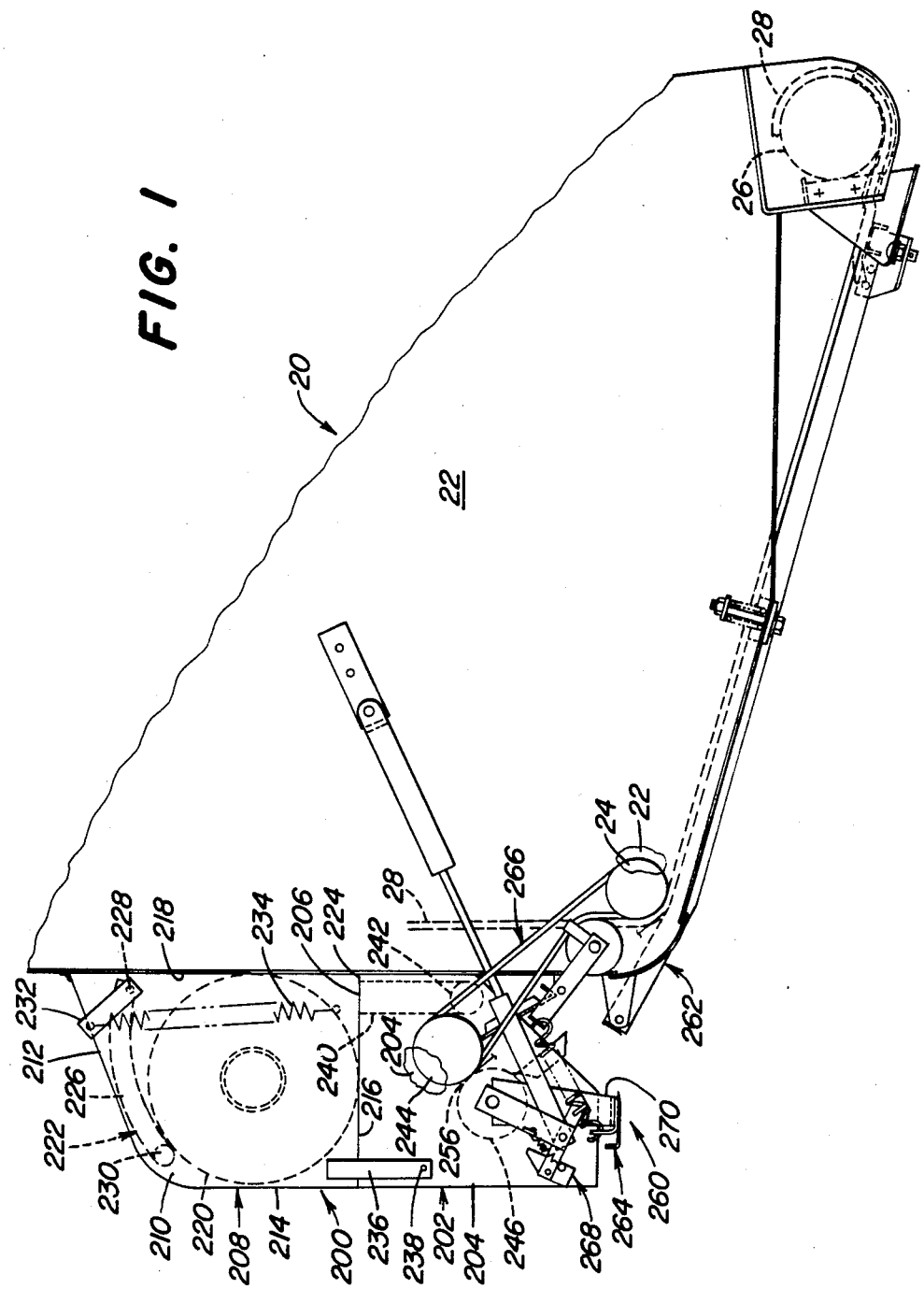
FIG. 1 is a right side elevational view of a portion of a bale discharge gate of a large round baler supporting a wrap material feed mechanism embodying a wrap material supply roll box or housing constructed in accordance with the principles of the present invention.

Initially, it should be noted that only one component is shown of some components described herein as occurring in pairs or multiples and it is to be understood that the construction of these unshown components is the same as or similar to that those shown.

Referring now to the drawings, there is shown a portion of a bale discharge gate 20 of a large round baler similar in construction to that disclosed in U.S. Pat. No. 4,444,098 granted to Anstey on Jan. 31, 1984. Extending between and rotatably mounted to opposite sidewalls 22 of the gate are lower rear and lower front bale-forming belt support rolls 24 and 26, respectively. A plurality of bale-forming belts 28 are supported in side-by-side, spaced relationship across the supports rolls 24 and 26 and other rolls of the baler and operate in a manner set forth in the above-mentioned U.S. Pat. No. 4,428,282 to roll crop products, introduced into a bale-forming chamber formed in part by said belts, into a bale.

A bale wrapping mechanism 200 is mounted to the rear of the gate 20 for introducing a wrapping material such as plastic sheet or net into the bale-forming chamber for enveloping the bale prior to its discharge.

Figure 2:
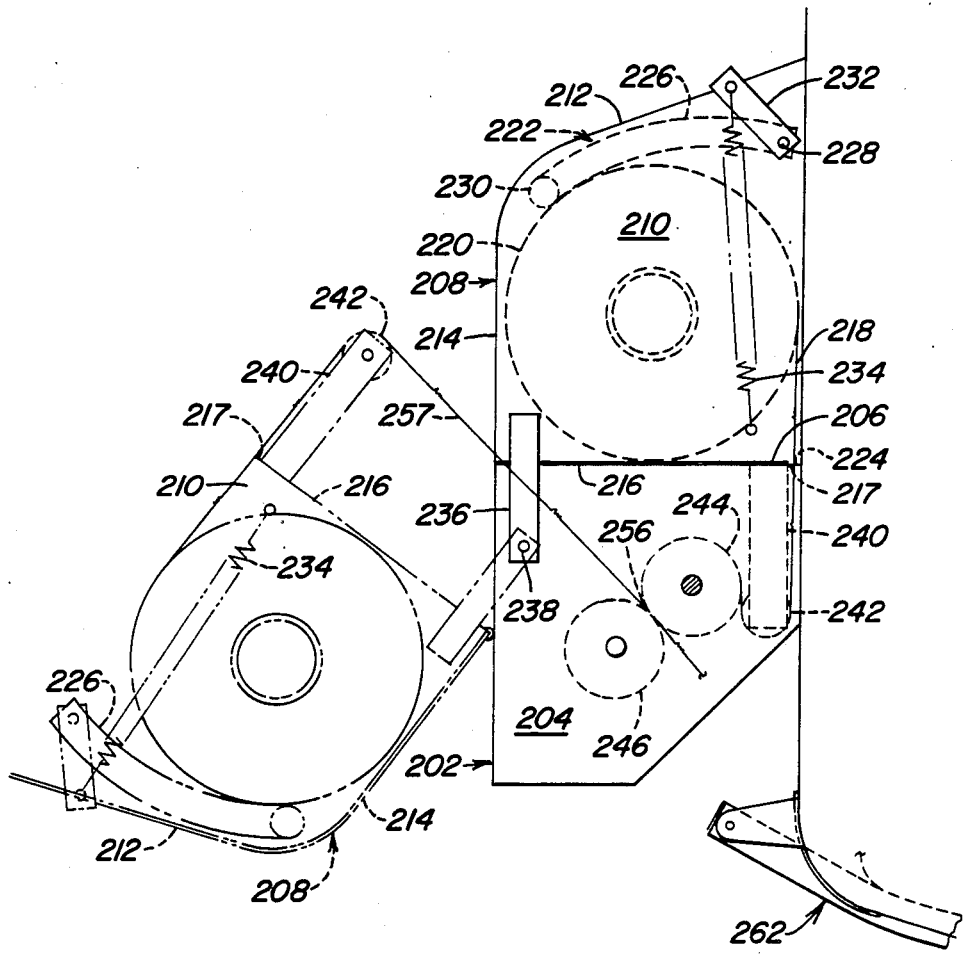
FIG. 2 is an enlarged right side elevational view showing the wrap material supply roll box of FIG. 1 in solid lines in a closed, dispensing position and in dashed lines in an open, loading position.

Specifically, the wrapping mechanism 200 includes a frame 202 including opposite vertical sidewalls 204 provided with forward vertical flanges bolted or otherwise secured to corresponding flanges forming vertical rear ends of the gate sidewalls 22. Tops of the sidewalls 204 are defined by horizontal flanges 206. A wrap material housing 208 has opposite sidewalls 210 joined together by a downwardly and rearwardly sloping top wall 212, a vertical rear wall 214 and a horizontal bottom wall 216 which terminates short of the front of the housing for defining a wrap material passage 217. The front of the housing 208 is closed by a vertical panel or abutment wall 218 extending between and joined to the gate sidewalls 22. Resting on the bottom wall 216 of the housing 208 is a supply roll of wrap material 220 which is biased, by an arm means including a U-shaped structure 222, toward a corner 224 defined by the juncture of a forward continuation of the bottom wall 216 and the panel 218. The U-shaped structure 222 includes a pair of arms 226 having forward ends respectively pivotally connected to upper forward locations of the sidewalls 210, as at pivots 228, and having rearward ends joined together by a crossbar 230 which engages an upper rear area of the roll of wrap material. A rearwardly projecting crank arm 232 is mounted to the right pivot 228 for rotation with the arm 226 and a spring 234 is coupled between the arm 232 and the right sidewall 210 so as to urge the crossbar 230 against the roll of wrap material 220. The U-shaped structure 222, crank arm 232 and spring 234 are located such that a force is applied to the wrap material supply roll 220 which changes as the material is used such that the force required to pull wrap material from the roll remains substantially constant. Also, the force exerted by the arm structure 222 acts to keep the roll engaged with the bottom wall 216 and panel 218 and to prevent accidental unwrapping of material from the roll. The housing 208 is mounted to the sidewalls 204 by a pair of straps 236 depending from lower rear locations of the sidewalls 210 and respectively coupled to the sidewalls 204 by pivots 238. Thus, the housing 208 may be pivoted rearwardly about the pivots 238 to a lowered open loading position, as shown in dashed lines in FIG. 2, permitting loading of a new roll of wrap. It is to be noted that such loading is not only facilitated by the fact that the open position of the housing makes it unnecessary to lift a roll of wrap material a great distance above the ground but also because the biased, U-shaped structure 222 makes it unnecessary to manipulate the roll of wrapping material onto end supports as is the case with known supply roll support structures.

A pair of spreader roll support legs 240 is secured to and depends from inner lower front locations of the housing sidewalls 210. Extending between and rotatably mounted adjacent the bottoms of the legs 240 is a wrap material spreader roll 242 comprising a cylindrical roll having spiral flighting (not shown) at opposite ends thereof and with the spirals being of opposite hands for acting on the wrap material to "feed" the opposite edges thereof toward the opposite sidewalls 204. When the housing 208 is in a raised, closed dispensing position, as shown in solid lines in FIG. 2, for example, the spreader roll 242 is disposed for rotation about an axis located forwardly of a forward wrap material drive roll 244 which is rotatably supported in the opposite sidewalls 204. A rear portion of the periphery of the spreader roll 242 is located very close to and slightly beneath a forward portion of the periphery of the drive roll 244. A rear wrap material drive roll 246 extends between and has opposite ends rotatably supported by the sidewalls 204 at a location below and rearwardly of the axis of rotation of the front drive roll 244. The drive rolls 244 and 246 include respective elastomeric surfaces which are in tight frictional engagement with each other so as to define a pinch point 256 for gripping wrap material fed therebetween. After a new roll of wrap material 220 has been loaded in the open housing 208, a length 257 of the wrap material is pulled from the roll and placed over the spreader roll 242 and manually fed into the drive rolls 244 and 246. The housing 208 is then closed resulting in the wrap material being wrapped about approximately three-fourths of the periphery of the drive roll 244.

The drive rolls 244 and 246 form part of a wrap material feed system 260 for introducing wrap material into a bale-forming chamber at an inlet located forwardly of the bale-forming belt support roll 26. The feed system 260 is not described in detail as it does not form part of the present invention. Suffice it to say that the material feed system 260 includes a wrap material guide assembly 262 for directing wrap material exiting the drive rolls 244 and 246 to the bale-forming chamber, a cut-off knife assembly 264 for cutting off a length of wrap material once wrapping of a bale is near completion, a drive roll drive assembly 266 for selectively driving the drive rolls when it is desired to wrap a bale formed in the chamber and a hydraulically controlled latch assembly 268 associated with the knife and drive assemblies 264 and 266 for selectively cocking a cut-off knife arm 270 while simultaneously effecting engagement of the drive roll drive (this is the condition illustrated) and for selectively releasing the arm 270 for effecting cutting of the wrap material at a location after the drive rolls while simultaneously effecting disengagement of the drive roll drive.

The wrap material supply roll 220 will merely rotate in place in the housing 208 as the drive rolls 244 and 246 pull wrap material therefrom thus making in unnecessary to rotatably support the cylindrical core of the roll. Further, it will be noted that throughout the diametrical change of the roll as the wrap material is used, the U-shaped structure 222 acts to apply a changing force to the supply roll 220 resulting in a substantially constant force being required to pull wrap material from the roll. The U-shaped structure 222 also acts to urge the supply roll 220 toward the corner 224 and thus serves somewhat as a drag brake to prevent material from being accidentally unwrapped from the roll 220. Also, the structure 222 acts to keep the forward surface of the roll 220 properly aligned for feeding wrap material through the passage 217 and about the spreader roll 242.

I claim:

1. In a large round baler including support structure adjacent a bale-forming chamber, a bale wrapping mechanism mounted to the support structure and including a wrap material supply roll support adapted for supporting a supply roll from which wrap material is pulled during wrapping of a bale located in the chamber, the improvement comprising: said supply roll support being defined in part by a housing including opposite sidewalls joined by top and bottom walls so as to define an opening facing the bale-forming chamber, when the housing is in a normal dispensing position, and a further wall opposite the opening; a panel fixed to the support structure and normally closing said opening; and a housing support including pivot means coupled to the housing and defining a horizontal pivot axis below a portion of the housing bottom wall remote from the chamber and about which the housing is pivotable to a lowered, loading position wherein the opening faces away from said chamber for receiving a supply roll of wrap material for being supported by the bottom wall when the housing is in its dispensing position.

2. A large round baler as defined in claim 1 wherein said supply roll support includes an arm structure including a cross member located within the housing and pivotally mounted to the sidewalls for movement which, as considered when the housing is in its dispensing position, is generally toward and away from a corner defined by the intersection of the panel and a forward continuation of the bottom wall; biasing means coupled to the cross member for biasing it toward said corner; and said arm structure being so located relative to said opening that a wrap material supply roll introduced through said opening when the housing is in its loading position will engage the arm structure and pivot it against the force of said biasing means.

3. In a large round baler including a bale discharge gate including opposite sidewalls defining a portion of a bale-forming chamber, a bale wrapping mechanism mounted to a rear portion of the gate and including a support frame extending rearwardly from the gate, and further including a wrap material supply roll support adapted for supporting a supply from which wrap material is pulled during wrapping of a bale located in the chamber; the improvement, comprising: said supply roll support being defined in part by a housing including opposite sidewalls joined by top, bottom and rear walls; said housing having an open forward side facing the gate when the housing is in a normal dispensing position; a panel mounted to the gate in closing relationship to the open forward side of the housing; a pair of depending legs respectively secured to lower rear portions of the housing; pivot means connecting lower ends of the legs to the support frame and defining a horizontal pivot axis located below said bottom wall and about which the housing is pivotable to a lowered loading position wherein the open side thereof faces rearwardly for receiving a supply roll of wrap material.

4. The large round baler defined in claim 3 wherein said bottom wall of the housing terminates adjacent the gate so as to define a wrap material exit at a corner defined by an intersection of a forward continuation of the bottom wall and the panel; arm means for engaging an upper rear area of a supply roll resting on the bottom wall; and biasing means connected to the arm means for causing the latter to urge the roll toward said corner for keeping the roll properly disposed for having wrap material fed from the front thereof through the wrap material exit.

5. The large round baler defined in claim 4 wherein said arm means includes a cross member located in the housing and adapted for engaging said upper, rear area of a supply roll resting on the housing bottom wall, at least one support arm joined to the cross member and vertically pivotally connected to upper forward locations of the housing sidewalls; said biasing means including a spring coupled between the support arm and the housing for biasing the cross member toward said corner; and said arm means being so located relative to said opening that a wrap material supply roll introduced through said opening when the housing is in its loading position will engage the arm means and pivot it against the force of said biasing means.

6. A large round baler defined in claim 3 wherein said housing has a pair of transversely spaced, downwardly projecting, roll support legs secured to the housing adjacent the open forward side thereof; a wrap material support roll extending between and rotatably mounted in lower ends of said pair of roll support legs; said wrapping mechanism further including a pair of transverse, wrap material drive rolls rotatably supported by the frame; and one of the drive rolls being located with a lower front peripheral portion thereof located adjacent an upper rear peripheral portion of the wrap material support roll, whereby a length of material may be pulled from a supply roll placed in the housing, when the latter is in its lower, loading position, and placed over the wrap material support roll and fed into the drive rolls with the wrap material support roll acting to wrap the periphery of the one drive roll with wrap material when the housing is raised to its normal, dispensing position.

7. The wrap material supply roll support defined in claim 4 wherein said arm means includes a U-shaped structure including arms having first ends pivotally mounted at locations spaced vertically above said zone and having second ends joined by a cross member adapted for engaging a wrap material supply roll.

8. The wrap material supply roll support defined in claim 7 wherein said arm means includes a crank arm joined to one of the arms of the U-shaped structure via the pivotal mounting of said one of the arms and a tension spring coupled to the crank arm.

* * * * *